United States Patent
Morawiec

[19]

[11] Patent Number: 6,010,405

[45] Date of Patent: *Jan. 4, 2000

[54] VIDEOGAME SYSTEM FOR CREATING SIMULATED COMIC BOOK GAME

[75] Inventor: Peter Morawiec, Mountainview, Calif.

[73] Assignee: Sega Enterprises, Ltd., Tokyo, Japan

[ * ] Notice: This patent is subject to a terminal disclaimer.

[21] Appl. No.: 08/367,810

[22] Filed: Dec. 30, 1994

[51] Int. Cl.$^7$ ..................................................... A63F 9/22

[52] U.S. Cl. .................................. 463/33; 463/9; 463/15; 395/501; 395/507

[58] Field of Search ....................................... 463/1, 30–33, 463/34–35, 36, 37, 38, 9, 15, 7; 434/307 R, 308, 309, 310, 314, 317, 323; 395/100, 118, 133, 152, 162, 164, 173, 501, 507, 509, 949, 950, 952; 345/112

[56] References Cited

U.S. PATENT DOCUMENTS

| | | | |
|---|---|---|---|
| Re. 34,161 | 1/1993 | Nakagawa et al. | 273/85 G |
| 4,167,019 | 9/1979 | Shepperd | 358/22 |
| 4,169,272 | 9/1979 | Rains et al. | 358/180 |
| 4,180,805 | 12/1979 | Burson | 340/709 |
| 4,200,867 | 4/1980 | Hill | 340/703 |
| 4,305,131 | 12/1981 | Best | 364/521 |
| 4,355,805 | 10/1982 | Baer et al. | 273/85 |
| 4,445,187 | 4/1984 | Best | 364/521 |
| 4,498,079 | 2/1985 | Ghosh | 340/725 |
| 4,500,879 | 2/1985 | Smith, III et al. | 463/37 |
| 4,521,020 | 6/1985 | Uemura et al. | 273/85 |
| 4,542,903 | 9/1985 | Yokoi et al. | 273/85 |
| 4,553,748 | 11/1985 | Allen et al. | 463/30 |
| 4,560,170 | 12/1985 | Enyi | 273/248 |
| 4,569,526 | 2/1986 | Hamilton | 273/242 |
| 4,580,782 | 4/1986 | Ochi | 273/86 |
| 4,600,200 | 7/1986 | Oka et al. | 273/313 |
| 4,660,157 | 4/1987 | Beckwith et al. | 364/522 |
| 4,666,160 | 5/1987 | Hamilton | 273/242 |
| 4,738,451 | 4/1988 | Logg | 273/153 |
| 4,766,541 | 8/1988 | Bleich et al. | 364/410 |
| 4,824,106 | 4/1989 | Ueda et al. | 273/1 |
| 4,834,374 | 5/1989 | Nakamura et al. | 273/1 |
| 4,841,291 | 6/1989 | Swix et al. | 340/725 |
| 4,871,167 | 10/1989 | Pasierb, Jr. | 273/1 |
| 4,890,833 | 1/1990 | Lantz et al. | 273/1 |
| 5,016,876 | 5/1991 | Loffredo | 273/437 |
| 5,050,883 | 9/1991 | Goldfarb et al. | 463/15 |
| 5,122,952 | 6/1992 | Minkus | 364/419 |
| 5,125,671 | 6/1992 | Ueda et al. | 273/437 |
| 5,356,156 | 10/1994 | Suzuki et al. | 273/437 |
| 5,357,604 | 10/1994 | San et al. | 395/162 |
| 5,358,259 | 10/1994 | Best | 273/434 |
| 5,363,483 | 11/1994 | Jones et al. | 395/161 |
| 5,466,158 | 11/1995 | Smith, III | 434/317 |
| 5,544,305 | 8/1996 | Ohmaye et al. | 395/154 |

*Primary Examiner*—Jessica Harrison
*Assistant Examiner*—Mark A. Sager
*Attorney, Agent, or Firm*—Dergosits & Noah LLP

[57] ABSTRACT

A videogame system is provided in which the audiovisual presentation is designed to simulate the episodic nature of a comic book page. The presentation is defined by distinct panels sequentially arranged to form a page layout, the panel limits player-controlled character play to an active panel in which the character must achieve predetermined tasks before he is allowed to move forward in the sequential arrangement of panels to create the story. A dialogue system is also provided for simulating speech balloons to convey emotion, effects and assist in the story-telling nature of the game. Graphical effects are provided to enhance the comic book medium simulation such as torn paper and a cartoonist's hand. In order to provide variety, there may be alternate routes through the panel sequences.

27 Claims, 6 Drawing Sheets

(2 of 6 Drawing Sheet(s) Filed in Color)

VIDEOGAME SYSTEM FOR CREATING SIMULATED COMIC BOOK GAME

TECHNICAL FIELD

This application relates generally to videogame systems, including the use of videogame cartridges (or equivalents such as cable-provided game software), game consoles and video screen displays, and in particular, this application relates to a videogame system whose audiovisual presentation simulates a comic book with its distinct layout and its episodic nature.

BACKGROUND OF THE INVENTION

A logical application of videogame technology is to provide videogame systems featuring comic book characters and stories. However, many previous comic-based videogame systems have merely employed a comic book hero as the main character in an otherwise common videogame system with horizontally scrolled backgrounds and "levels" of play representing essentially random adventures in different worlds characterized by different background graphics. These prior comic book game systems have not been able to capture the essence of the comic book medium such as visually and episodically distinct story panels or the ability to create and to follow a story line, compared to the random wanderings in the various worlds characteristic of most videogame formats.

It is an object of the present invention to provide a videogame system whose audio visual presentation authentically simulates the traditional comic book format particularly with respect to the "snapshot" story style. Simultaneously, it is an object of the present invention to preserve the playability, interactivity and discoverability of existing videogame systems. These objectives required the use of rich detailed comic-book-like graphics which could be distributed on ROM (or the equivalent such as downloading from cable.) These objectives, in one embodiment designed for a 16 bit videogame system, were implemented in the COMIX ZONE™ product, a comic book simulation which captures the essential features of the comic book medium.

SUMMARY OF THE INVENTION

The attributes of the videogame system of the present invention which enhance the comic book simulation are a level-type structure arranged in a page layout with well-defined, distinct panels which are bounded in both space and time in the episodic telling of the story. In other words, only one panel is active for player-controlled character movement and interaction at one time, and the player-controlled character must finish predetermined tasks within the active panel before moving onto the next panel. Each panel is one scene in the story told on the page layout. The route which the player-controlled character takes through the panels on the page layout determines the story line. The player can be provided with alternative routes through the page. The ratios of the rectangular page layout dimensions also enhance the comic book look. The videogame system of the present invention is characterized by an art style which employs strong colors, flat shaded areas and exaggerated animations. The system of the present invention also utilizes a dialogue system which simulates the speech balloons commonly used in the comic book medium to convey emotion, story information and text effects such as "Ka-Pow" after a punch. Other graphical effects, for example, the cartoonist's hand drawing in characters in a panel, help to emphasize the "comic book world" inside the page versus the "real world" outside of the page.

As part of the episodic nature of the comic book simulation of the present invention, the player-controlled character is specifically limited to play in one panel on the page layout until the predetermined tasks within that panel have been completed. Upon completion of the tasks within the active panel, under player control, the player-controlled character appears to jump out of the active panel just completed, over the panel break between panels and into the next panel of the story which then becomes active. The player is informed of the panel sequence alternatives by directional arrows in the currently active panel which indicate the next panel in the story. When alternate paths through the page layout are available for player selection, more than one directional arrow will appear in the panel. In one embodiment, previously completed panels cannot be revisited during game play to emphasize the "forward" direction of the time and story flow behind the page layout. To emphasize the paper nature of the comic book medium, certain animation effects are provided, for example, when demon characters are destroyed, graphics which simulate torn up small pieces of paper shower through the panel representing the demon destruction. In another example of these paper-medium-enhancing graphics, a bomb burst causes a hole to be blown through the page on which the panels are written. Another aspect of the present invention which furthers the comic book simulation is clearly defined panel boundaries which strictly limit graphical effects such as rain or flowing water to a particular panel and which do not permit overflow of these graphical effects into adjacent panels. In one embodiment of the present invention, these panel boundaries are structured so that the player-controlled character cannot be seen outside of the active panel, thereby indicating that the player-controlled character can only perform tasks in the active panel.

These comic-book-look-enhancing graphical effects are implemented in the familiar videogame system format by approximately matching panel size to video display screen size, although, it may sometimes be possible to see an active panel plus partial views of panels which are inactive (dormant) because the player-controlled character has either not yet entered that panel or has already completed it. The protocol of approximately matching panel size to display screen size provides the player with a reasonable environment in which to explore and to interact. In order to provide the player with a reasonable degree of freedom in game play, there are panels which provide alternate routes through the page layout, giving the player panel-selection options on how to play through the page layout, and also giving the player options in their attempts to solve the predetermined tasks. The videogame system also provides a combination of predetermined combat and strategy tasks in each panel which must be completed before the player-controlled character is permitted to move forward into the next panel of the page layout. The player-controlled character is also permitted to accumulate and to carry forward items which may be useful in confronting future tasks in subsequent panels. The videogame system, in a preferred embodiment, is provided with the ability to keep score based upon the completion of the predetermined tasks.

BRIEF DESCRIPTION OF THE FIGURES

The file of this patent contains at least one drawing executed in color. Copies of this patent with color drawings will be provided by the Patent and Trademark Office upon request and payment of the necessary fee.

DETAILED DESCRIPTION OF THE INVENTION

The current state of the relevant art indicates that fully programmable microprocessing to generate graphical images on a raster-based video display screen is well known. See, e.g., U.S. Pat. Nos. 4,871,167 and 5,357,604. The present application is written for those of ordinary skill in this highly developed art.

The present invention is described herein with reference to its implementation on the Sega Genesis 16 bit platform. However, this description is intended to illustrate the present invention and is not intended to limit the scope of the invention to the Sega Genesis or any equivalent 16 bit videogame systems. The present invention may clearly be implemented on 32 bit or 64 bit videogame systems. In addition, the game data and instructions can be provided on game cartridges with ROM, or it can be provided on CD/ROM. In addition, the game data and instructions can be obtained from cable delivery systems such as described in U.S. Pat. No. 5,251,909.

The videogame system of the present invention must have certain fundamental elements: (i) a console which contains a controller having a microprocessor and memory with the capability of communicating with a player-controlled input device and with a game program source including instructions and game data and with the capability to create audio visual images on a raster-scanned display screen; (ii) a player-controlled input device for providing signal outputs to the console which are responsive to player input, primarily to control movable character x-y movements and to fire weapons and the like; and (iii) a game program source, for example a game cartridge with ROM or a cable source.

The videogame system of the present invention also must have the capability to implement character-tiles to generate background graphics on the raster-scanned display screen as well as to implement movable, player-controlled characters known as sprites. The videogame game program source includes instructions and game data which define the game rules and the dialogue system used to generate simulated speech balloons to convey emotion, story information and text effects.

Figure 1:
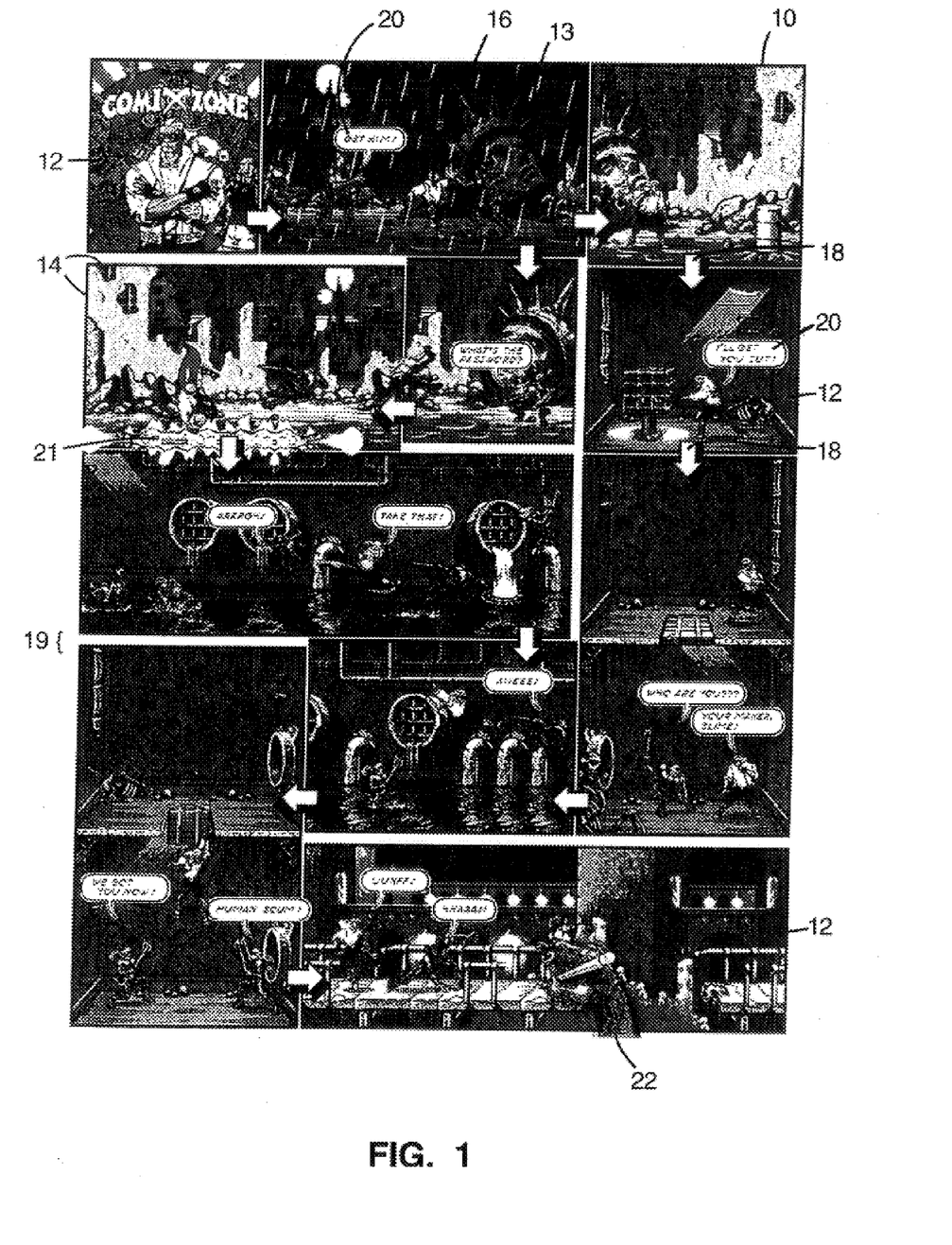
FIG. 1 is a graphical representation of a page layout showing the distinct panels which make up the story.

The major features of the present invention are best illustrated with reference to FIG. 1 which shows a page layout from the COMIX ZONE™ game. The page 10 is comprised of multiple panels 12 which are sequentially arranged to tell the story. In a preferred embodiment, the page layout dimensions are selected to simulate the familiar rectangular comic book page. The panel boundaries 14 define the panels 12 in space and time, and the player-controlled character 16 is restricted to play in an active panel 13 until he has completed certain predetermined combat and strategy tasks. In the embodiment implemented on the Sega Genesis 16 bit platform, the panels 12 are sequentially arranged such that the player-controlled character 16 can only move forward in the panel sequence and cannot revisit previously played panels on the page layout. This forward-only feature is an attribute of the preferred embodiment but it is not essential to the present invention, and the appended claims are not intended to be limited to this forward-only feature.

The panel sequence options are presented to the player through the use of directional arrows 18 which signal the direction in which the player-controlled player can move. At certain panels, the player may have to choose among alternative routes through the page layout. This feature allows certain variability to game play, providing greater player interest and variety. In between the panels 12 are panel breaks 19 which help to emphasize comic-book-look of the videogame system and its associated graphics. The story told by the sequential arrangement of panels 12 is further enhanced by the use of a dialogue system which simulates speech balloons 20 to convey emotion, story information and text effects. In a preferred embodiment of the present invention, additional animation effects 21 are provided to enhance the comic book nature of the game. In particular, when a bomb explodes, the background is torn in the panel. In another example from the preferred embodiment, the "comic book world" inside the panel is distinguished from the "real world" outside the panel by graphics such as the cartoonist's hand 22 drawing character elements in the panels.

Figure 2:
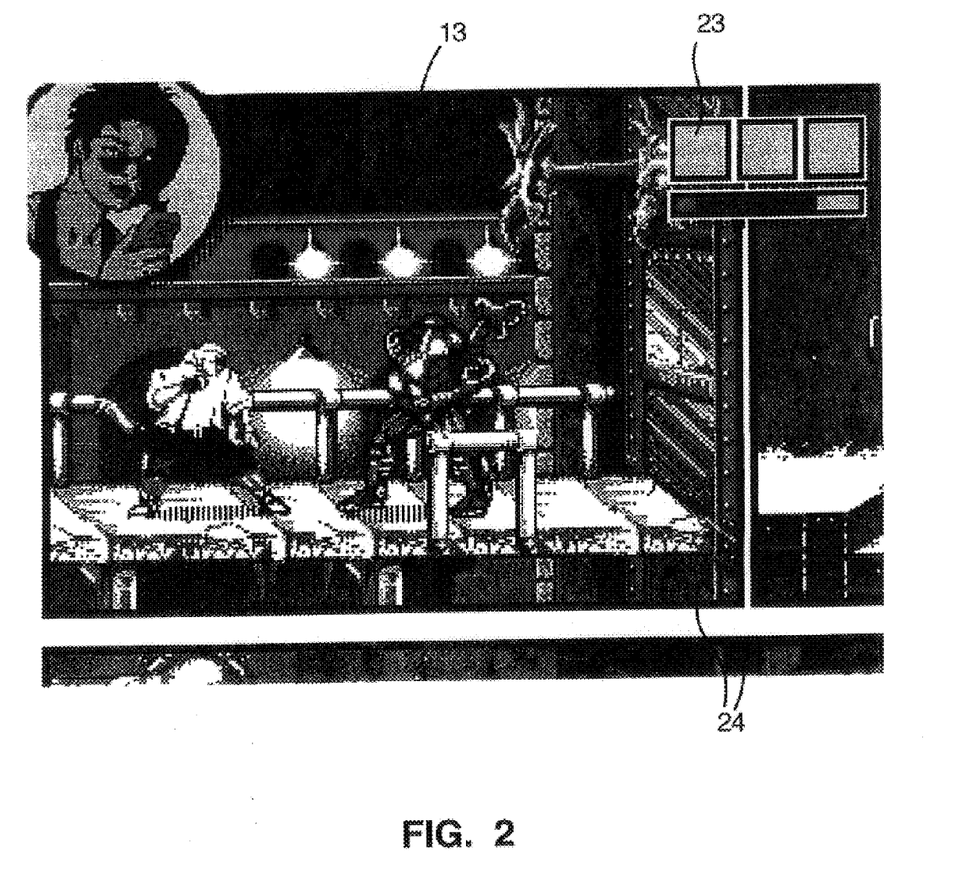
FIG. 2 is a graphical representation of a video display screen showing the relationship between the screen display and the panels.

FIG. 2 shows a toolbar 23 which contains scoring information and items which the player-controlled character can collect and use to perform the predetermined panel tasks and to carry forward into subsequent panels. The player can score points during the game play based upon performance of the predetermined tasks.

FIG. 2 illustrates the video screen display. While the active panel 13 fills most of the screen display, it is possible to see portions of other panels 24 which are dormant. The distinction between active panels and dormant panels is explained more fully below, particularly with respect to how the player-controlled character is limited to play and display in the active panel.

Figure 3:
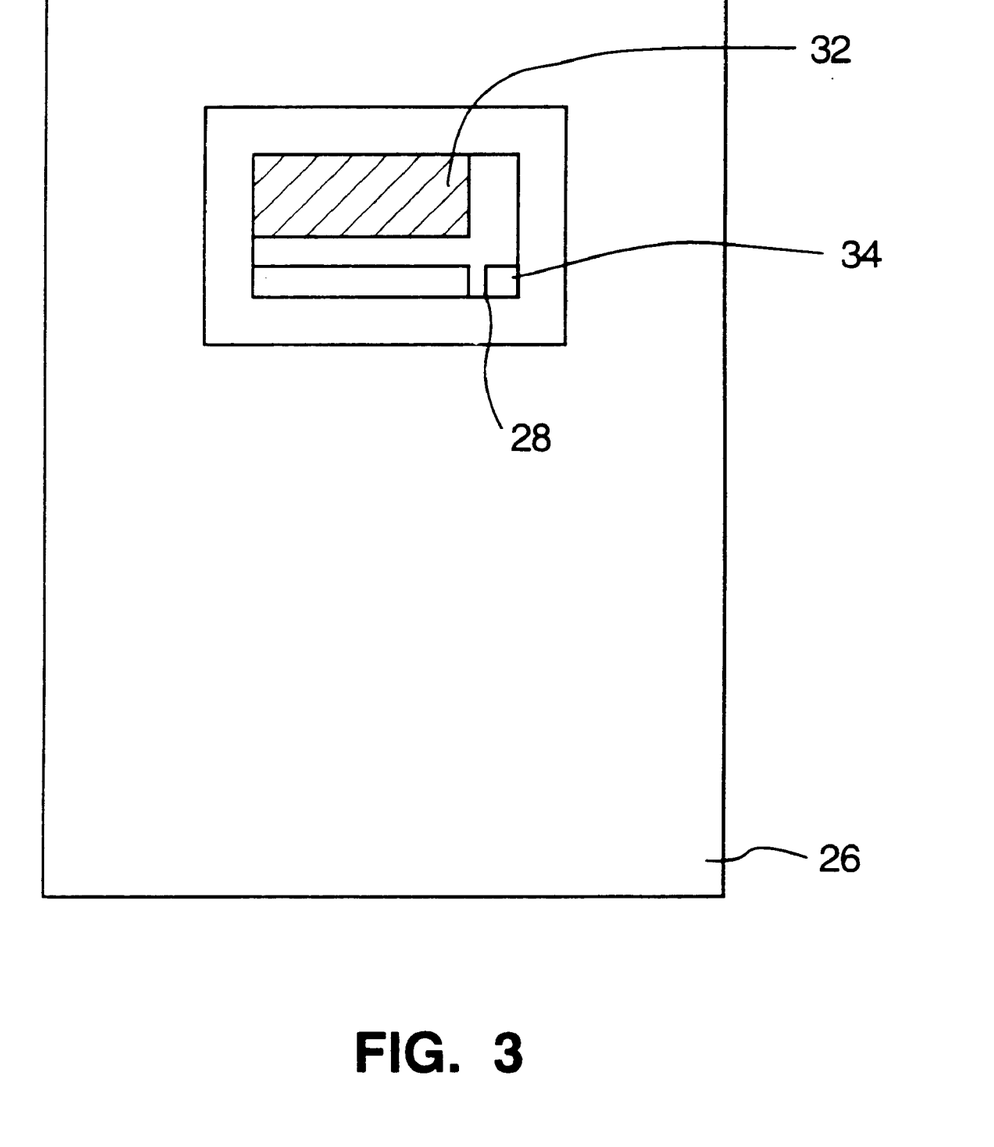
FIG. 3 is a diagram showing the relationship between the page layout and the video display screen.

The relationship between the page layout 26 and the screen display 28 is shown in FIG. 3. In the 16 bit embodiment, the graphical character element data for the page layout 26 is stored in compressed form in the game cartridge ROM. The data compression technology for generating the compressed data, and for its decompression by the videogame system of the present invention is referred to as LZSS. It was described and provided in an article entitled "Data Compression Algorithms of LARC and LHarc," Haruhiko Okumura, which appears not to have been published in the normal technical literature. The relevant portions are therefore provided here.

LZSS Coding

This scheme is initiated by J. Ziv and A. Lempel, IEEE Trans, IT-23, 337–343 (1977). A slightly modified version is described by J. A. Storer and T. G. Szymanski, J. ACM, 29 928–951. An implementation using a binary tree is proposed by T. C. Bell, IEEE Trans. COM-34, 1176–1182 (1986). The algorithm is quite simple: Keep a ring buffer, which initially contains "space" characters only. Read several letters from the file to the buffer. Then search the buffer for the longest string that matches the letter just read, and send its length and position in the buffer.

If the buffer size is 4096 bytes, the position can be encoded in 12 bits. If we represent the match length in four bits, the <position, length> pair is two bytes long. If the longest match is no more than two characters, then we send just one character without encoding, and restart the process with the next letter. We must send one extra bit each time to tell the decoded whether we are send a <position, length> pair or an unencoded character.

The accompanying file LZSS.C is a version of this algorithm. This implementation uses multiple binary trees to speed up the search for the longest match. The programs in this article were written in draft-proposed ANSI C and were tested with Turbo C 2.0.

A portion 30 of the entire page layout 26 is decompressed and prepared for display on the display screen 28. Within the display screen 28, there is an active panel 32 and portions of dormant panels 34 are shown. In the preferred embodiment, the active panel 32 has character generation attributes which are different from the other portions of the screen display 28 which causes a difference in appearance. The expression of these different attributes in the active panel versus the rest of the display (and the rest of the page layout) is made possible by defining the rectangular area within the active panel 32 differently from the balance of the page layout 26. This location-dependent graphical capability enables the presentation of different graphical effects and different player-controlled character display capabilities for the active panel 32 versus the balance of the display screen 28.

While a zoom feature is not part of the embodiment implemented on the 16 bit platform, it is possible to provide a videogame system in which the player has the option to view the entire page layout on the display screen and then to "zoom" into the specific panels of interest for a more selective and close-up view of the active panel.

In the COMIX ZONE™ game as implemented on the Sega Genesis 16 bit platform, there were a number of hardware and software limitations which had to be overcome to enable a plausible comic book simulation game. The source code for the COMIX ZONE™ game program is attached hereto as Appendix I. Some of these implementation problems and solutions are specifically described below.

Priority Technology To Allow Depth

Referring to FIG. 3, in order to visually distinguish the active panel 32 (the panel in which the player-controlled character is currently performing tasks) from any dormant panels 34 which are shown on the display screen 28, the display graphics are processed differently depending on location so that the character element graphics in the active panel have a greater three dimensional feel than those displayed in the dormant panels which are flatter in appearance. This visual distinction between a three dimensional feel and a flat appearance is controlled by the use of character "priorities," which instruct the 68000 series microprocessor and video RAM ("VRAM") on board the Sega Genesis platform how the various graphic elements should be displayed relative to the other graphic elements in the scene. Higher priority character elements come to the foreground of the scene, and mask or the priority over any other graphic elements which are in the same location but which have lower priority. For example, the background in a particular scene may be a mountain range, and the desired foreground is a series of rocks. In order to enable the rocks to appear in front of the mountain range, the rocks must be assigned a higher priority than the mountains in that particular region of the display. One of the primary distinctions between the dormant panels and the active panels is the relative priorities of the character elements. In the active panel, the character elements are displayed using their stored priorities producing a depth perception or three dimensional appearance because the character elements have relative priorities, placing them on different planes within the screen display. The dormant panels are characterized by graphical character elements having a single high priority so that the elements are essentially displayed on a single plane within the screen display, leading to the flat appearance within the dormant panels.

Another significant visual distinction between the active panel and the dormant panels which was desired to enhance the episodic nature of the comic book simulation was the appearance and behavior of the player-controlled character. In the active panel, the player-controlled character is permitted free movement within the boundaries of the active panel. However, the player-controlled character does not appear outside the boundaries of the active panel, even if the player causes the player-controlled character to travel outside of these boundaries. The player-controlled character should not appear in the dormant panels. This effect is also achieved through the use of character priority data processing.

The 16 bit platform provides a challenge to the presentation of graphic character elements as three dimensional in a single active panel and flat-appearing graphics in all other locations (as well as containing display of the player-controlled character to the active panel) because the 16 bit platform has limited memory space and because data format for the 16 bit platform provides only one bit for priority. Both of these challenges are met in the COMIX ZONE™ game by defining the rectangle of the active panel differently from all other regions of the page layout for purposes of the display engine. In the active panel, the single priority bit stored as a regular part of the character data is expressed to create the perception of depth within the active panel because all of the elements will have varying relative priorities. In the remaining portions of the page layout (i.e., the dormant panels and breaks between them), all character element priorities are set to a single high value which gives them a flat appearance because there is no relative variation in display priority, causing them all to appear on a single plane. This priority shifting outside of the active panel also insures that the player-controlled character will have a lower priority than all of the other character elements which have all been given a high priority for all regions of the page layout outside of the active panel.

It is worth noting at this point that the term "character" is used in two different ways. In one sense, "character" is used to refer to "tiles" or 8×8 pixel blocks which make up the visual presentation of the videogame. The second use of "character" is in its more familiar sense—a character in a story. It is important to keep this distinction in mind when referring to the priority technology.

The Sega Genesis display engine handles the movable characters (such as the player-controlled character) separately from the tile-characters, and generates their display differently than the tile-characters. Nonetheless, the priority technology feature which sets the tile-character priorities to a uniform high value outside the rectangular area of the active panel will still have the same effect on the player-controlled character. The higher priority tile-characters outside of the active panel will obscure the display of the player-controlled character.

Consequently, in the COMIX ZONE™ video game, character priority is made a function of location (within the active panel or not). Since the data format for storing character information allows only one bit for priority information, character priority cannot be made and stored as a function of location because of the 16 bit hardware limitation, and its allocation of 1 bit to priority data. Since the data format only permits storage of a single priority bit, the desired effect of differing appearances cannot be achieved simply using the 16 bit data format. The problem encountered is providing the capability to enable panel-dependent character priority without storing an additional bit of priority data, or without storing the same character graphics multiple times with differing priorities.

These limitations have been overcome in the 16 bit platform. The game graphics data is stored as one large page layout, containing multiple panels. The video console microprocessor can determine which part of the page layout (panels) will be displayed by the display screen at any particular time. The problem of location-dependent priority is solved by defining arbitrary rectangles (corresponding to the active panel) in which the character element graphics are displayed using their stored priority data to create the three-dimensional appearance because the character elements appear on different planes. On the other hand, in a dormant panel on the display screen (and all other regions of the page layout), the normal character priority information stored with the 16 bit character data is suppressed and all character elements are assigned the same high priority to create the desired flat appearance in the dormant panel. Thus, if the video console microprocessor determines that a particular section of the display screen falls within the predefined rectangle (the active panel), then it utilizes the previously-stored character element priority information to create the three dimensional feel of the active panel. In the dormant panels, the stored priorities are suppressed and replaced by a single uniform value to provide character elements with a single high priority to create a flat appearance. What is truly occurring is that an area of the bit map has been defined in which to apply a function (suppress original priority data bit and substitute new value) if the character element falls outside of the predefined rectangle (the active panel). Therefore, the character element does not have to be stored more than once with different priorities depending on location and whether the panel is then active. Instead, the game code provides a routine which enables expression of the stored character priority if it falls within the predefined rectangle, and to otherwise suppress and replace the stored priority bit.

Display List Allowing Display Modification

In the COMIX ZONE™ game, the art style employs a lot of strong colors, flat shaded areas and exaggerated animation. It also employs a number of special effects, like rain falling down, streams flowing and characters standing in water. There are also animation effects which emphasize the "paper" nature of the game such as tearing up the paper into little pieces or burning holes into the paper. In order to accomplish each of these special graphics effects using the 16 bit platform, certain parallel processing or multitasking capabilities were implemented in order to provide the special graphics effects at the right place at the right time.

According to the present invention, the display list technology is used to insure that a desired graphical effect is implemented at a specific location and at a specified time on the display screen. For example, the display list can be used to change the color palette for the display of certain character elements which appear in a specified region of the display, or the display list can be used to cause water in a particular area to shimmer by turning on the bit which corresponds to the shimmer effect. The display list is a management system which changes attributes of character elements as a function of time and location on the video display screen within the parameters of acceptable display and processing timing.

The display list technology takes advantage of some existing attributes of the 16 bit platform to create the desired special effects without having to employ a completely different system. The Sega Genesis display engine has a system which causes a horizontal blank interrupt to occur at time zero and then at regularly spaced intervals during the generation of the horizontal scan lines which comprise the video screen. Because of its regularity, this interrupt scheme limits its use for generating special effects at specific locations on the display screen. The present invention permits the generation of horizontal interrupts at arbitrary locations on the display screen, alternate to those regularly generated by the Sega Genesis console.

Figure 4:
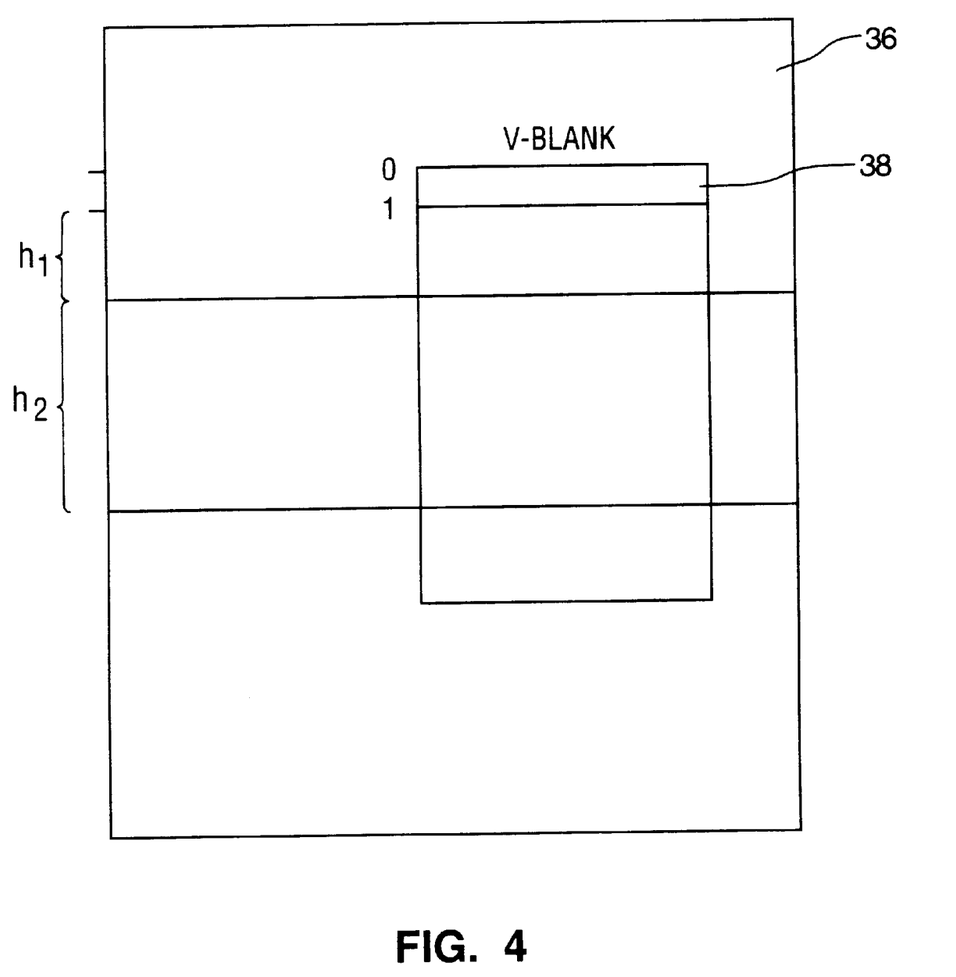
FIG. 4 is a diagram showing the creation of vertical interrupts in the generation of the video display screen at specified horizontal scan line locations in order to implement a desired special graphical effect at a specific location on the video display screen.

The present invention is explained with reference to FIG. 4. The page layout 36 has a smaller portion 38 which represents the video display screen having horizontal scan lines (not individually shown). At certain locations on the page layout 36, there are special graphical character elements which require more character data storage than permitted by the 16 bit data format. These "events" in space and time on the page layout 36 are shown as occurring at horizontal lines $h_1$ and $h_2$. Since the Sega Genesis platform has regularly spaced vertical interrupts which are defined by registers which identify where the interrupts should take place and how many horizontal scan lines must be counted before the next vertical interrupt, the present invention provides a software routine for modifying the register information. In the source code attached as Appendix I, the routine entitled TASKER.68K contains Hbl_vbl and hbvl_hbl.

Another hardware feature of the Sega Genesis console is that the interrupt always occurs at one scan line less than the intended scan line. In order to cause the horizontal interrupt to occur at the desired alternate location, the register conversions set forth in Table 1 are required. The Sega Genesis system is based upon a design in which the register is not used directly. Instead, the system takes the latched value and decrements an internal value. r0 is the latched horizontal blank counter (counting scan lines). r1 is the actual horizontal blank counter.

TABLE 1

| Horizontal Scan Line | Register Value | Register Value |
| --- | --- | --- |
| 0 | r0=(h1−1)−1 | r1←0 |
| 1 | r0=(h2−h1)−1 | r1←(h1−1)−1 |
| h1 | r0=(h3−h2)−1 | r1←(h2−h1)−1 |

Once the vertical interrupt is caused at the specific horizontal scan line on which the special graphical effect is desired, the display list technology automatically calls the routine associated with the desired special effect and implements it at that location. The routines can be assembled as a list and the desired routine called from the list and implemented during the vertical blank occurring at that time and place.

Some of the applications of the display list technology in the COMIX ZONE™ game include changing the color palette used to color the graphical character elements and then changing it back to the original color palette, turn on the shimmering water effect, and to make the screen darker in a particular location.

Dynamic VRAM Character Allocation

The 16 bit platform has a specific capacity for storage of graphical character element data in the VRAM. One of the challenges faced in the implementation of the COMIX ZONE™ game on the 16 bit platform involves the use of an increased number of graphical character elements to provide rich, strong graphics. In order to enable this capability for the COMIX ZONE™ game, it was necessary to develop a way to define graphical character elements in the VRAM even though it involved more storage than the VRAM hardware in the 16 bit platform could accommodate.

In prior videogame programs written for the Sega Genesis platform, graphical character elements had the following format for the character data:

| P | C | Y | X | Character |
|---|---|---|---|---|
| 15 | 13–14 | 12 | 11 | 10-0 |

This data format enables the definition of 2048 graphical character elements.

According to the present invention, a modified data format is provided in order to obtain the capacity to store up top 4096 graphical character elements:

| P | C | Y | X | Character |
|---|---|---|---|---|
| 15 | 14 | 13 | 12 | 11-0 |

The decreased color data in this data format is accommodated by the ability to use multiple color palettes as described above with reference to the display list technology.

The 64K VRAM allocates 32K for tile-character storage and normally has the capacity to store approximately 1023 character elements. The Sega Genesis display engine determines which character elements are to be displayed in the portion of the page layout to be shown on the screen. The VRAM contains the character elements which should be displayed. According to the present invention, a virtual character element table is created which can be used to map more character elements into the VRAM than can be stored in the VRAM alone. This capability is described with reference to FIG. 5.

Figure 5:
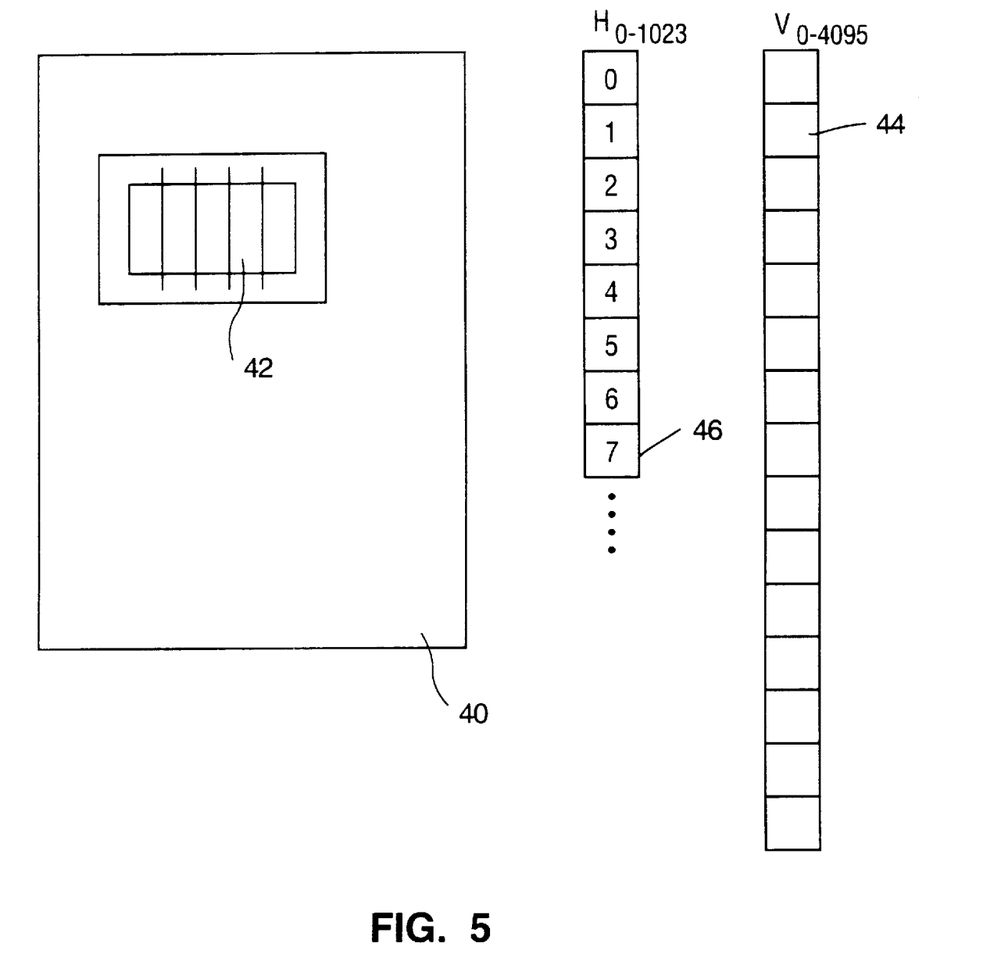
FIG. 5 is a diagram showing the mapping relationship between virtual character elements and VRAM character element storage as implemented on a 16 bit console.

The page layout 40 is comprised of a series of character elements. The portion of the page layout which will be displayed on the screen is shown as the region 42. The region 42 is made up of a series of character elements which are called out of the ROM 44 where they are stored as virtual characters, and then placed into the VRAM hardware character storage 46. The display engine also determines how many times that the character element will appear in region 42, and increments the character element count each time that the character element to be displayed is actually displayed. As an area (a vertical rectangular section of region 42) moves off of the display screen, the display engine decrements the character element count for the number of times that character element appeared in the prior area. When the count reaches zero, the display engine determines that the hardware character in the VRAM has become free and available for use to display other character elements. Thus, when the display engine needs to assign VRAM storage space to a previously unused character element stored in the virtual character table, it determines which VRAM hardware character space is available and maps the character element from the virtual character table into the VRAM storage.

In the preferred embodiment, the list of vacant spaces on the VRAM character element storage is placed on a linked list in the order that the vacancies appear. This allows the display engine to use the vacancies at the top of the linked list first to increase the probability that the vacant character element will not reappear.

The source code routines which correspond to the allocation of VRAM storage space can be found under the title CACHSCRL.68K.

Another feature of the embodiment running on the 16 bit platform involves the programming of the console microprocessor to multitask, or to perform multiple tasks to utilize the maximum processing capability of the 68000 microprocessor. In its application to generate audiovisual presentations, the microprocessor is designed to accomplish its functions in ⅟₆₀th of a second intervals which correspond to the refresh rate on the video display screen. The multitasking approach utilized here recognizes that there is processing time left over in many instances, before ⅟₆₀th of a second has passed. The multitasking programming allows the microprocessor to use this additional time to perform other functions apparently simultaneous with the display function. The source code routine corresponding to the multitasking feature is found at TASKER.68K.

The dialogue system which is used in the present invention is found in the attached source code at BALLOON.68K. There is a routine which runs for each enemy and each panel which determines when an enemy needs to say something. For example, the routine is programmed so that if the player-controlled character strikes an enemy character, then the enemy character is programmed to say "Ouch!" The program logic determines what the character should say for each event. The program outputs a string of text which is converted to the Sega Genesis format bit map in RA<using a proportional bit map font. This text is uploaded to the VRAM, and the text is then surrounded by a balloon border using character-tiles. This hardware displayable sprite (combining the text and the border) is entered into the display sprite list.

Figure 6:
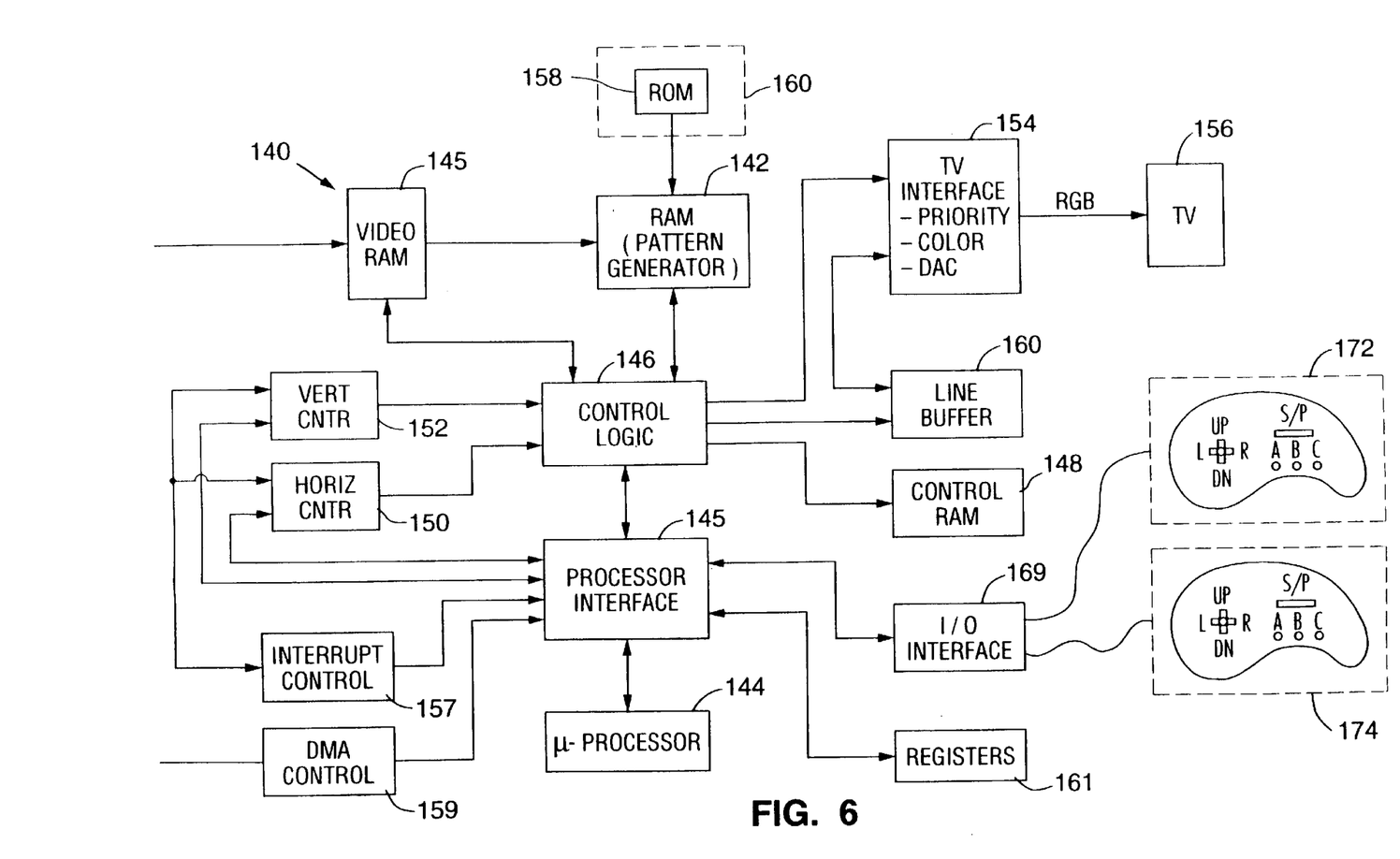
FIG. 6 is a block diagram of a videogame system according to the present invention.

Referring to the illustrative drawing of FIG. 6, there is shown a block diagram of videogame system 140 in accordance with the present invention. The system 140 includes a RAM 142, a video RAM (VRAM) 145, a Microprocessor 144, a processor interface 45, control logic 146, a control RAM 148, a horizontal counter control 150, and a vertical counter control 152. The system 140 further includes interrupt control 157, direct memory access (DMA) control 159, a line buffer 160, registers 161 and I/O interface 164. A TV interface circuit 154 provides RGB analog signals to TV system 156.

The RAM 142 (character data storage) receives graphics information from a cartridge-based ROM 158.

First and second external player controllers 172, 174 are connected to the system 40 through the I/O interface 164. The player controllers 172, 174 each include buttons to control game character movement. The first player controller 172 controls the movement of a first game character (sprite). The second player controller 174 controls movement of a second game character (sprite). The S/P button controls start/pause of game play. Buttons, A, B, C are used for special game features such as character attacking or character taking on special powers. Buttons labeled with L, R, Up, Dn are used to cause the game character to move left or right or to jump up or to crouch down.

In operation, the video RAM 145 stores graphics patterns for the sprite plane and for the scroll A and scroll B planes. As the TV displays screen is scanned line-by-line, patterns corresponding to the graphics information for the scroll A, scroll B and the sprite plane are retrieved, and three independent signals are produced which are representative of the graphics patterns for scroll A, scroll B and the sprites plane, A priority controller in the TV interface 154 selects the appropriate signal on cell-by-cell basis according to designated priorities. A color decoder and DAC in the TV interface 154 receives the output of the priority controller and generates a corresponding RGB signal for transmission to the TV system 156.

While the present invention has been described with reference to a particular embodiment, it is understood that the disclosure has been made for purpose of illustrating the invention by way of example and is not intended to limit the scope of the attached claims. It is understood that components may be arranged in different ways and that equivalent devices can be substituted for those described here. These changes and substitutions are not intended to depart from the scope and the spirit of the present invention.

What is claimed is:

1. A videogame system for playing a game based upon a simulated comic book page having a player-controlled character and a story comprising:

videogame program source containing game data and game instructions for use by a system controller to generate an audiovisual presentation which simulates a comic book page;

a player-operated input device for providing input signals to control movements of the player-controlled character; and a system controller, including a game microprocessor for executing a videogame program and a video display processor coupled to the game microprocessor and a video random access memory, coupled to the video display processor, for storing data used in generating a video display, for executing the game data and game instructions to provide a videogame audiovisual presentation on a video display, the audiovisual presentation comprising a plurality of distinct panels separated by panel breaks, the plurality of panels are arranged sequentially to form a page layout, each panel representing boundaries in space and time and each panel having predetermined tasks for performance by the player-controlled player, the sequential order of the plurality of panels determined responsive to a predefined set of game rules and responsive to the player-operated input device.

2. The videogame system of claim 1 wherein the audiovisual presentation further comprises simulated speech balloons which convey emotion, story information or text effects.

3. The videogame system of claim 1 wherein the system controller only permits the player-controlled character to move forward in the panel sequence and does not permit the player-controlled character to revisit panels previously visited.

4. The videogame system of claim 1 wherein the dimensions of the panels of the simulated comic book page are selected to simulate an actual printed comic book page.

5. The videogame system of claim 1 wherein the audiovisual game presentation further comprises graphical character animations which simulate a paper nature of the comic book simulation.

6. The videogame system of claim 1 wherein the system controller permits the player to select among multiple routes for the player-controlled character to allow for advancement of the panel sequence.

7. The videogame system of claim 1 wherein at least one of the plurality of panels contains graphical character items which the player-controlled character can collect in one frame and use in subsequent frames.

8. The videogame system of claim 1 wherein the system controller awards, tracks and causes an audiovisual presentation of the player-earned points based upon a player's performance of predetermined player tasks.

9. A method of playing a game based upon a simulated comic book page using a videogame program source, video display, controller and player input device combined to provide a videogame system which method comprises the steps of:

a) providing (i) videogame program source containing game data and game instructions for use by a system controller to generate an audiovisual presentation which simulates a comic book page; (ii) a player operated input device for providing input signals for controlling movements of a player-controlled character; and, (iii) a system controller, including a game microprocessor for executing the game data and game instructions and a video display processor coupled to the game microprocessor and a video random access memory, coupled to the video display processor for storing data used in generating a video display, for executing the game data and game instructions to provide a videogame audiovisual presentation on a video display, the audiovisual presentation comprising a plurality of distinct panels separated by panel breaks, the plurality of panels are arranged sequentially to form a page layout, each panel representing boundaries in space and time and each panel having predetermined tasks for performance by the player-controlled player, a sequential order of the panels determined responsive to a predefined set of game rules and responsive to the player operated input device;

b) starting the comic book story simulation with the player-controlled character in a first panel of the panel sequence;

c) controlling movements of the player-controlled character to perform predetermined tasks in each of the plurality of panels using the player input device;

d) causing the player-controlled character to move from one panel to next panel in the panel sequence using the player input device; and e) simulating an actual comic book story by causing the player-controlled character to play through the panel sequence.

10. The method of claim 9 wherein the audiovisual presentation further comprises simulated speech balloons which convey emotion, story information or text effects.

11. An apparatus for operating a videogame, the videogame being based on a comic book motif, wherein a player manipulates a character of a story through a series of graphical panels designed to simulate cartoon panels of a comic book, the apparatus comprising:

a) a player-operated input device for providing input signals to the apparatus to specify activities of the character;

b) a display system for displaying a graphical image; and c) a controller, receiving the input signals from the input device, the controller (i) representing in a memory system one or more simulated pages of a comic book, each simulated page including a plurality of the graphical panels laid out in a predetermined arrangement, (ii) including in a designated one of the graphical panels a graphical representation of the character, the graphical representation being generated in accordance with the activities specified by the input signals, (iii) extracting from the simulated pages the graphical image for display in the display system, the graphical image including the designated graphical panel and selected portions of graphical panels adjacent, in accordance with the predetermined arrangement, the designated graphical panel.

12. An apparatus for operating a video game as in claim 11, wherein said controller constrains manipulation of said character through said graphical panels to one of a plurality of predetermined paths, each predetermined path defining a sequence of traversal through said graphical panels.

13. An apparatus for operating a video game as in claim 12, wherein each of the predetermined paths is directed such that manipulation of the character along the predetermined path is required to follow a predetermined direction of traversal.

14. An apparatus for operating a videogame as in claim 11, wherein said activities include simulated combat and strategic tasks, said controller evaluating said input signals in accordance to a predetermined set of rules governing said simulated combat and strategic tasks to select a location for said designated graphical panel and to determine said graphical representation of said character.

15. An apparatus for operating a video game as in claim 11, wherein the controller further (i) assigns game characters to each of the graphical panels, and (ii) selects a graphical representation from a predetermined set of graphical representations for each game character, and includes the graphical representation in the graphical image panel.

16. An apparatus for operating a video game as in claim 15, wherein the controller further includes in the graphical image, for the game characters assigned to a designated panel, graphical representations of expression, including speech, emotions and thoughts.

17. An apparatus as in claim 11, wherein the controller generates in the image a graphical representation showing a tear in the simulated page.

18. An apparatus as in claim 11, wherein said controller generates in said image a graphical representation showing said simulated page burning.

19. An apparatus as in claim 11, wherein the controller associates with the game character, data which represents items collected in the graphical panels, in response to the input signals, the item data including a numerical score for evaluating the skill of the player.

20. A method for operating a videogame, the videogame being based on a comic book motif, wherein a player manipulates a character of a story through a series of graphical panels designed to simulate cartoon panels of a comic book, the method comprising the steps of:

(a) receiving input from an input device operated by the player, the input signals specifying activities of the character;

(b) representing in a memory system one or more simulated pages of a comic book, each simulated page including a plurality of the graphical panels laid out in a predetermined arrangement;

(c) including a designated one of the graphical panels is a graphical representation being generated in accordance with said activities specified by the input signals;

(d) extracting from the simulated pages a graphical image, the graphical image including said designated graphical panel and selected portions of graphical panels adjacent, in accordance with the predetermined arrangement, the graphical panel, and (e) displaying the graphical image in a video display.

21. A method for operating a video game as in claim 20, further comprising the step of constraining a manipulation of the character through the graphical panels to one of a plurality of predetermined paths, each predetermined path defining a sequence of traversal through the graphical panels.

22. A method for operating a video game as in claim 21, wherein each of the predetermined paths is directed such that manipulation of the character along the predetermined path is required to follow a predetermined direction of traversal.

23. A method for operating a videogame as in claim 20, wherein said activities include simulated combat and strategic tasks, said method further comprising the step of evaluating said input signals in accordance to a predetermined set of rules governing said simulated combat and strategic tasks to select a location for said designated graphical panel and to determine said graphical representation of said character.

24. A method for operating a videogame as in claim 20, further comprising the steps of:

(a) assigning game characters to each of the graphical panels, and (b) selecting a graphical representation from a predetermined set of graphical representations for each game character, and including the graphical representation in the graphical image panel.

25. A method for operating a videogame as in claim 24, further comprising the step of including in the graphical image, for the game characters assigned to the designated panel, graphical representation of expressions, including speech, emotions and thoughts.

26. A method as in claim 20, further comprising the step of generating in the image a graphical representation showing a tear in the simulated page.

27. A method as in claim 20, further comprising the step of associating with the character, data which represents items collected in the graphical panels, in response to the input signals, the item data including a numerical score for evaluating a skill of the player.

* * * * *